G. W. & J. FIELDES.
FIFTH WHEEL.
APPLICATION FILED FEB. 15, 1912.

1,034,605.

Patented Aug. 6, 1912.
2 SHEETS—SHEET 2.

WITNESSES

INVENTORS:
G. W. & J. Fieldes,
their Attorney

UNITED STATES PATENT OFFICE.

GEORGE W. FIELDES AND JOSEPH FIELDES, OF CLENDENIN, WEST VIRGINIA.

FIFTH-WHEEL.

1,034,605.

Specification of Letters Patent. Patented Aug. 6, 1912.

Application filed February 15, 1912. Serial No. 677,740.

*To all whom it may concern:*

Be it known that we, GEORGE W. FIELDES and JOSEPH FIELDES, citizens of the United States of America, residing at Clendenin, in the county of Kanawha and State of West Virginia, have invented certain new and useful Improvements in Fifth-Wheels, of which the following is a specification.

This invention relates to fifth wheels for vehicles and one of the principal objects of the invention is to provide a combined fifth wheel and head block or bolster which can be connected to the axle and reach without the use of bolts or rivets to weaken any of the parts.

Another object of the invention is to provide a fifth wheel and head block combined which will not be provided with projecting bolt heads to catch in the various parts to injure the same in use.

Still another object of the invention is to provide a fifth wheel and head block to which the springs of the vehicle are connected by clips and in which the various parts are connected together by means of clips instead of through bolts, thus providing a substantial and durable device for its purpose.

These and other objects may be attained by means of the construction illustrated in the accompanying drawings, in which:—

Figure 1:
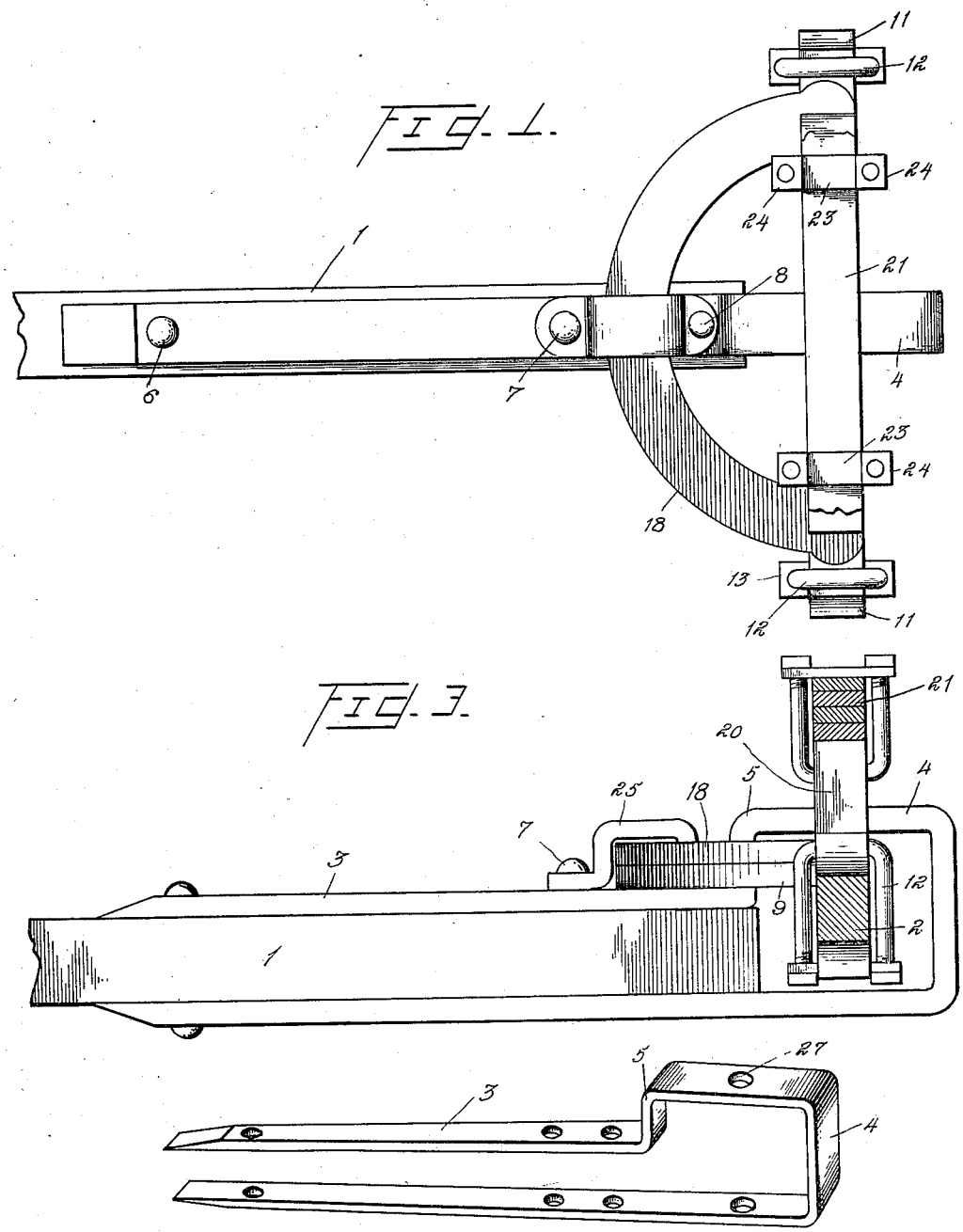
Figure 2:
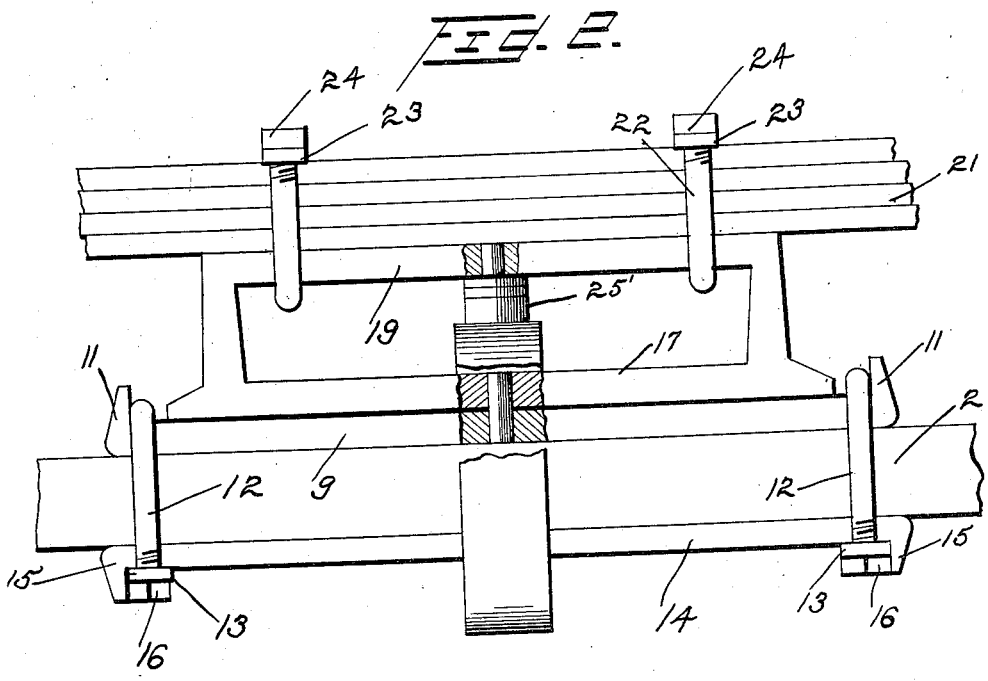
Figures 5, 7:
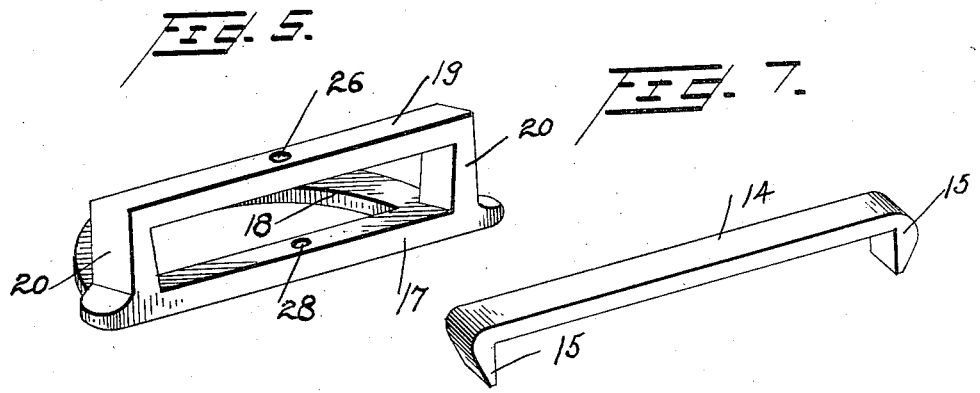
Figure 6:
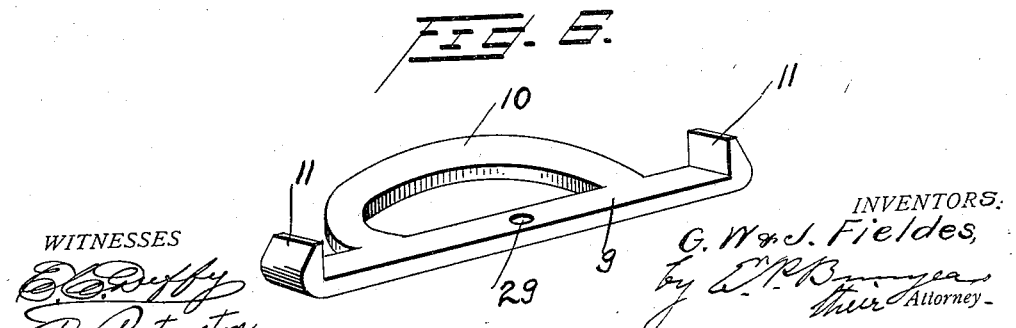

Figure 1 is a top plan view of the combined fifth wheel and head block or bolster made in accordance with our invention; Fig. 2 is a front end elevation of the same, the springs being shown broken away; Fig. 3 is a side elevation of the same, the springs and axle being shown in section; Fig. 4 is a detail perspective view of the hammer strap for connecting the fifth wheel to the reach; Fig. 5 is a perspective view of the upper member of the fifth wheel; Fig. 6 is a similar view of the lower member of the fifth wheel; and Fig. 7 is a perspective view of one of the holding bars and wear plates.

Referring to the drawings, the numeral 1 designates the reach of the vehicle, 2 is the axle and 3 is the hammer strap connected to the reach and extending beyond the end thereof to form a loop 4, said loop being enlarged by means of the bend 5. The hammer strap 3 is secured to the reach 1 by means of suitable bolts 6, 7 and 8. The lower fifth wheel member 9 is provided with the usual semi-circle 10 and the straight bar connected to said semi-circle, said bar having upwardly turned lugs 11 at its outer ends. The lower member is connected to the axle which extends through the enlargement 4 of the hammer strap by means of suitable clips or staples 12, said staples being screw threaded and extending through plates or bars 13 which extend across underneath the axle, said clips being held in place by means of a strap or bar 14 provided at its outer ends with downwardly projecting lugs 15 which limit the movement of the clips 12. Nuts 16 are applied to the threaded ends of the clips 12. The upper member of the fifth wheel is provided with a base bar 17, a semicircle 18 and a bolster or head block 19 spaced from the base bar 17 by the integral members 20. The springs 21 which may be of the usual or any suitable structure are connected to the head block or bolster 19 by means of clips or staples 22 having threaded ends extending through plates or bars 23 and provided with suitable nuts 24 for clamping the members in place. A keeper 25 is secured to the reach at one end by means of bolt 7, while the opposite end is secured to the reach by means of the bolt 8, said keeper extending over the two semicircles of the fifth wheel, as shown more clearly in Figs. 1 and 3.

A pivot pin 25' having an upper reduced end extends through the perforation 26 in the head block or bolster 19 while at its lower end said pivot pin is reduced and extends through the perforation 27 in the hammer strap and through the perforation 28 in the base bar 17 and is extended through the perforation 29 of the lower member of the fifth wheel.

Our fifth wheel can be readily connected to a reach without means of bolts extending through the springs, the fifth wheel or the axle, the parts being firmly clamped in position and connected together so that they will work smoothly and not be liable to get out of order.

We claim:

A fifth wheel for vehicles comprising a hammer strap connected to the reach of the vehicle and having an enlarged loop extending beyond the end thereof, a lower fifth wheel member comprising a semi-circle connected to an integral straight bar provided with upturned lugs at its opposite ends, said lower member connected to the axle by means of staples screw threaded at the ends and extending through plates extending across underneath the axle, said axle extending through said loop on the end of the hammer strap, a strap for holding said staples in place, said strap provided with downturned lugs, said strap bearing against the axle on its upper side and bearing against said plates on its under side, an upper fifth wheel member comprising a semi-circle connected to an integral base bar, and a head block spaced from the base bar by integral lugs, said head block secured to the springs of the vehicle by means of staples identical in construction with the before mentioned staples, and a pivot pin provided with an upper reduced end extending through the head block, and a lower reduced end extending through the hammer strap and said base bar and the lower member of the fifth wheel.

In testimony whereof we affix our signatures in presence of two witnesses.

GEORGE W. FIELDES.
JOSEPH FIELDES.

Witnesses:
FRANK E. PHILPOTT,
PORUS J. YOUNG.

---

Copies of this patent may be obtained for five cents each, by addressing the "Commissioner of Patents, Washington, D. C."